(12) United States Patent
Dalton et al.

(10) Patent No.: US 6,180,722 B1
(45) Date of Patent: Jan. 30, 2001

(54) DUAL CORE GOLF BALL COMPOSITIONS

(75) Inventors: Jeffrey L. Dalton, North Dartmouth; Kevin M. Harris, New Bedford, both of MA (US); Laurent C. Bissonnette, Portsmouth, RI (US); Derek A. Ladd, New Bedford, MA (US); Steven M. Gosetti, Providence; Samuel A. Pasqua, Tiverton, both of RI (US)

(73) Assignee: Acushnet Company, Fairhaven, MA (US)

( * ) Notice: Under 35 U.S.C. 154(b), the term of this patent shall be extended for 0 days.

(21) Appl. No.: 09/160,101

(22) Filed: Sep. 25, 1998

Related U.S. Application Data

(63) Continuation-in-part of application No. 09/048,348, filed on Mar. 26, 1998, now Pat. No. 6,093,357.

(51) Int. Cl.$^7$ .......................... A63B 37/06; A63B 37/00; C08L 9/00
(52) U.S. Cl. .......................... 525/193; 473/373; 473/374
(58) Field of Search ................................... 473/373, 374; 525/193

(56) References Cited

U.S. PATENT DOCUMENTS

| | | | |
|---|---|---|---|
| 4,625,964 | 12/1986 | Yamada | 273/62 |
| 4,650,193 | 3/1987 | Molitor et al. | 273/228 |
| 4,714,253 | 12/1987 | Nakahara et al. | 273/228 |
| 4,781,383 | 11/1988 | Kamada et al. | 273/228 |
| 4,848,770 | 7/1989 | Shama | 273/228 |
| 4,863,167 | 9/1989 | Matsuki et al. | 273/62 |
| 4,919,434 | 4/1990 | Saito | 273/235 R |
| 4,979,746 | 12/1990 | Gentiluomo | 273/220 |
| 5,002,281 | 3/1991 | Nakahara et al. | 273/220 |
| 5,026,067 | 6/1991 | Gentiluomo | 273/220 |
| 5,048,838 | 9/1991 | Chikaraishi et al. | 273/228 |
| 5,072,944 | 12/1991 | Nakahara et al. | 273/220 |
| 5,150,905 | 9/1992 | Yuki et al. | 273/218 |
| 5,184,828 | 2/1993 | Kim et al. | 273/228 |
| 5,253,871 | 10/1993 | Viollaz | 273/228 |
| 5,255,922 | * 10/1993 | Proudfit . | |
| 5,314,187 | 5/1994 | Proudfit | 273/235 R |
| 5,407,998 | 4/1995 | Horiuchi et al. | 525/133 |
| 5,439,227 | 8/1995 | Egashira et al. | 273/228 |
| 5,482,285 | 1/1996 | Yabuki et al. | 273/228 |
| 5,490,674 | 2/1996 | Hamada et al. | 273/228 |
| 5,553,852 | 9/1996 | Higuchi et al. | 473/373 |
| 5,556,098 | 9/1996 | Higuchi et al. | 473/373 |
| 5,601,502 | 2/1997 | Hiraoka et al. | 473/373 |
| 5,681,898 | 10/1997 | Pocklington | 525/193 |
| 5,683,312 | 11/1997 | Boehm et al. | 473/354 |
| 5,688,191 | 11/1997 | Cavallaro et al. | 473/373 |

FOREIGN PATENT DOCUMENTS

| | | |
|---|---|---|
| 28623/97 | 1/1998 | (AU) . |
| 2 299 518 | 10/1996 | (GB) . |
| 2 300 574 | 11/1996 | (GB) . |
| 2 302 035 | 1/1997 | (GB) . |
| 2 302 037 | 1/1997 | (GB) . |
| 51-49840 | 4/1976 | (JP) . |
| 60-241463 | 11/1985 | (JP) . |
| 64-80377 | 3/1989 | (JP) . |

OTHER PUBLICATIONS

Encyclopedia of Polymer Science and Engineering vol. 12 pp. 84–86.*
Surlyn Product Guide–DuPont.*

* cited by examiner

*Primary Examiner*—David J. Buttner
(74) *Attorney, Agent, or Firm*—Pennie & Edmonds LLP

(57) ABSTRACT

A dual core golf ball and methods for preparing portions thereof including a core having at least one core layer, a mantle having at least one layer including an amount of reinforcing polymer component and a resilient polymer component disposed concentrically adjacent the core, and a cover layer disposed concentrically adjacent the mantle, wherein the at least one mantle layer is sufficiently rigid to inhibit the resilient polymer component from substantially altering shape prior to crosslinking. The invention also includes an elastomeric composition for the mantle that includes a resilient polymer component having a predominantly 1,4-cis content, a free-radical initiator, and a reinforcing polymer component having a sufficiently low viscosity at a mixing temperature to permit substantially uniform dispersion of the polymer component with the resilient polymer component and having a crystalline melting point sufficiently low to permit mixing while avoiding substantial crosslinking.

39 Claims, 3 Drawing Sheets

DUAL CORE GOLF BALL COMPOSITIONS

CROSS-REFERENCE TO RELATED APPLICATION

This application is a continuation-in-part of application Ser. No. 09/048,348 filed on Mar. 26, 1998, now U.S. Pat. No. 6,093,357.

FIELD OF THE INVENTION

The present invention relates to a golf ball and methods and compositions for the preparation of the same including a core having a center with at least one center layer, a mantle having at least one mantle layer including an amount of reinforcing polymer component and a resilient polymer component disposed concentrically adjacent the center, and a cover layer disposed concentrically adjacent the core, wherein the mantle or at least one layer of the mantle is sufficiently rigid to inhibit the resilient polymer component from substantially altering shape prior to crossliking.

BACKGROUND OF THE INVENTION

Multi-layer golf balls, including dual core balls, contain a core, which may include one or more layers of solid material or one or more layers of solid material encompassing a fluid therein, and a cover. Optionally, a tensioned elastomeric material may also be used to form a layer surrounding the center to provide certain playing characteristics. Such balls are known as "wound" balls. The multi-layer golf balls discussed herein include a core and a cover. The terms "core" or "ball core," as used herein, include a center having one or more layers and a mantle formed of one or more layers. The terms "center" or "ball center," as used herein, include a solid and/or fluid mass around which at least a mantle and cover are placed. The fluid may be a liquid or a gas. The mantle is disposed between the center and the cover, typically in concentric fashion, with the cover being the outermost portion of the ball.

A variety of golf ball compositions are known and used in various methods of manufacture. Unfortunately, these compositions and methods tend to produce balls that do not consistently achieve a symmetrical core. See, for example, the discussion in co-pending application Ser. No. 08/943,932, filed on Oct. 3, 1997 by J. DALTON et al., now U.S. Pat. No. 6,056,842 which illustrates the poor centering that occurs in conventionally formed golf balls. This co-pending application is expressly incorporated herein by reference thereto for this purpose. Multi-layer ball production has been plagued by center portions that become off-centered during the manufacture of such balls. Off-center golf balls are a hindrance to many players, particularly those able to achieve great control using a symmetrical ball. This lack of symmetry is now believed to be caused, at least in part, by the materials and methods conventionally used in forming multi-layer golf balls. A number of these conventional multi-layer ball compositions are discussed below.

U.S. Pat. No. 4,781,383 discloses a solid three-piece golf ball made by covering a core, which has inner and outer layers, with a shell. The outer layer of cis-1,4-polybutadiene, zinc diacrylate, and zinc oxide is prepared by using a metal mold to prepare two hemispherical premolded products, which are used to cover the previously molded inner layer of the core. The outer layer is then cured around the inner layer by heating the entire core before adding the shell.

U.S. Pat. No. 4,919,434 discloses a two-piece golf ball having a solid core of more than 40% cis-1,4-polybutadiene and a cover having an inner layer of 0.1 to 2 mm thickness and an outer layer of 0.1 to 1.5 mm thickness. The inner layer is a thermoplastic resin, such as an ionomer, polyester elastomer, polyamide elastomer, thermoplastic urethane elastomer, propylene-butadiene copolymer, 1,2-polybutadiene, polybutene-1, and styrene-butadiene block copolymer, either individually or in combination.

U.S. Pat. No. 5,150,905 discloses a rubber composition usable in golf balls having at least one natural or synthetic rubber component, inorganic fibers subjected to surface treatment, and a non-sulfur type vulcanizing agent. The rubber may include known additives, such as organic modifiers of various resins like cumarone-indene, phenol, polystyrene, acrylic, polyamide, epoxy, urethane, polyolefin, and similar resins. The rubber may also include long fiber reinforcing material, such as fibers of glass, carbon, metal, quartz, ceramic, nylon, vinyl, polyester, aromatic polyamide, polyimide, and aromatic polyether amide.

U.S. Pat. No. 5,253,871 discloses a three-part golf ball including an elastomer core, an intermediate layer of a thermoplastic material containing at least 10%, preferably at least 35%, of ether block copolymer, and a thermoplastic envelope. The other copolymer of the intermediate layer is disclosed to be one or more ionomers.

U.S. Pat. No. 5,273,287 discloses a golf ball weighing no more than 1.62 ounces, having a mean outside diameter of at least 1.70 inches and a dimple pattern on at least 70 percent of the surface that has a plurality of dimples having different diameters.

U.S. Pat. No. 5,314,187 discloses a golf ball having a core, as well as a cover having an inner layer of a cut-resistant material such as an ionomer resin and an outer layer of natural or synthetic balata and one or more thermally crosslinkable elastomeric polymers.

U.S. Pat. No. 5,439,227 discloses a multi-piece solid golf ball having a solid core with an inner layer of a rubber and an outer layer of 100–50 wt % of a polyether ester type thermoplastic elastomer having a $T_g$ of up to −25° C. and 0–50 wt % of an ethylene-(meth)acrylate copolymer ionomer, and a cover of ethylene-(meth)acrylate copolymer ionomer.

U.S. Pat. Nos. 5,553,852 and 5,556,098 disclose a three-piece solid golf ball with a conventional rubber center core, an intermediate layer of thermoplastic elastomer or thermoplastic elastomer and ionomer resin mixture, and a cover typically of an ionomer resin, each portion having a particular hardness and thickness.

U.S. Pat. No. 5,601,502 discloses a three-piece solid golf ball including a core of a center having an α,β-unsaturated carboxylic acid metallic salt in an amount of 13 to 28 parts by weight based on 100 parts by weight of base rubber and an outer shell having an α,β-unsaturated carboxylic acid metallic salt in an amount of 28 to 35 parts by weight based on 100 parts by weight of base rubber. The base rubber preferably has a cis-1,4 structure of 40% or more, particularly 85% or more.

U.S. Pat. No. 5,681,898 discloses a golf ball having a solid core and a cover, with an intermediate layer including a first component of an uncrosslinked blend of n-butyl acrylate and ethylene methacrylic acid copolymer, which is sold under the name NUCREL, and a second component of a vulcanizate formed from polybutadiene and a peroxide curing agent. The vulcanizate is ground to a fine powder and then conventionally mixed with pellets of the NUCREL and melted for injection molding.

U.S. Pat. No. 5,683,312 discloses a golf ball having a fluid mass at the center, a first non-wound mantle layer of a thermoset rubber material, thermoplastic elastomeric material and plastic, a second non-wound mantle layer of a thermoset rubber material or thermoplastic elastomeric material, and a cover.

U.S. Pat. No. 5,688,191 discloses a multi-layer golf ball having a core with one or more layers, at least one cover layer, and one or more mantle layers disposed therebetween, wherein the mantle layer includes dynamically vulcanized thermoplastic elastomer, functionalized styrene-butadiene elastomer, thermoplastic polyurethane, metallocene polymer or blends thereof, and thermoset materials.

U.S. Patent No. 5,738,597 discloses a golf ball weighing no more than 1.62 ounces, having a diameter of 1.73 to 1.75 inches, a cover thickness of 0.125 inches or greater and a cover hardness of Shore D60 or greater.

It is desirable to use thermoset material-containing hemispherical shells to form one or more mantle layers about a golf ball center, although this often results in poor centering of the mantle and other difficulties because thermoset materials are difficult to work with before they have been crosslinked. The polymers typically used in such shells tend to have a memory that urges the polymer back to its earlier or original shape, which necessitates rapid compression molding to crosslink the polymer as soon as the shells are formed.

There is thus a need for an improved golf ball composition that avoids the disadvantages present when using thermoset material-containing hemispherical shells to form one or more mantle layers about a center. A new golf ball composition for one or more layers of a golf ball mantle that advantageously improves the symmetrical formation of the core in golf balls is also desired. It is believed that such improved golf ball compositions will facilitate injection molding of uncrosslinked shells and permit increased automated assembly of the golf ball, which greatly reduces production costs.

SUMMARY OF THE INVENTION

The present invention relates to a multi-layer golf ball having a center including a first resilient polymer component and a first metal acrylate crosslinking agent present in an amount from greater than 12 to about 35 parts per hundred of the polymer, a mantle having at least one layer disposed concentrically about the center, which layer includes a second resilient polymer component, a reinforcing polymer component having a crystalline melting temperature from about 35° C. to 120° C. present in an amount from about 1 to 40 parts per hundred of the polymer, wherein the second resilient polymer component is present in an amount from about 60 to 99 parts per hundred of the polymer and wherein the mantle layer is sufficiently rigid prior to crosslinking to inhibit the second resilient polymer component in the mantle from substantially altering shape, and a cover having at least one layer disposed concentrically about the mantle.

It should be understood that the term "phr" or "parts per hundred" is with reference to all the polymer by weight. Each type of "polymer component," i.e., resilient polymer component or reinforcing polymer component, may also include one or more types of polymers.

In one embodiment, the at least one mantle layer further includes a second metal acrylate crosslinking agent present in an amount from about 36 to 50 parts per hundred of the polymer. In another embodiment, the center further includes a filler including at least one of a coloring agent, a metal, or sulfate, oxide, carbonate, or silicate thereof, or ground rubber, wherein the filler is present in an amount from about 0.5 to 80 parts per hundred of the polymer. In another embodiment, the mantle further has a filler including at least one of a coloring agent, a metal, or sulfate, oxide, carbonate, or silicate thereof, or ground rubber, present in an amount from about 1 to 20 parts per hundred of the polymer in the mantle.

In another embodiment, the first and second resilient polymer components each have a molecular weight average of about 50,000 to 1,000,000. In another embodiment, the second resilient polymer component is present in an amount from about 70 to 90 parts per hundred of the polymer in the mantle. In yet another embodiment, at least one organic peroxide is present in at least one of the center or mantle in an amount from about 0.05 to 5 parts per hundred of the polymer present in the center or mantle. In another embodiment, each crosslinking agent includes a metallic salt selected from the group of an unsaturated fatty acid, a monocarboxylic acid, and mixtures thereof. In another embodiment, the uncrosslinked mantle layer has a flexural modulus of greater than about 3.5 MPa.

In one embodiment, the reinforcing polymer component includes at least one of a block copolymer ether/ester, an acrylic polyol, a trans-polyisoprene, a trans-polybutadiene, a 1,2-polybutadiene, an ethylene-vinyl acetate copolymer, a polyethylene or copolymer thereof, an ionomer resin, or a trans-polyoctenamer. In another embodiment, the center and the mantle together form a golf ball core having a midpoint and the center of the center is disposed within about 40 mils on average from the midpoint of the core. In another embodiment, the core has a moment of inertia, the center and the mantle each have a hardness, and the value of the moment of inertia divided by a ratio of the center hardness divided by the mantle hardness is greater than about 65 g•cm².

The invention further relates to a multi-layer golf ball having a center including a first resilient polymer component, a first crosslinking agent, and a first filler present in an amount from about 5 to 80 parts per hundred of the polymer, a mantle having at least one layer disposed concentrically about the center, which layer includes a second resilient polymer component, a second crosslinking agent present in an amount from about 36 to 50 parts per hundred of the polymer, and a second filler present in an amount from about 1 to 20 parts per hundred of the polymer, wherein the mantle layer is sufficiently rigid prior to crosslinking to inhibit the second resilient polymer component in the mantle from substantially altering shape and wherein the mantle layer has a lower density than the center, and a cover having at least one layer disposed concentrically about the mantle.

In one embodiment, the first crosslinking agent is present in an amount from greater than 12 to about 35 parts per hundred of the polymer. In another embodiment, the at least one mantle layer further includes a reinforcing polymer component having a crystalline melting temperature from about 35° C. to 120° C., wherein the reinforcing component is present in an amount from about 1 to 40 parts per hundred and the second resilient polymer component is present in an amount from about 60 to 99 parts per hundred of the total polymer. In yet another embodiment, the center further includes a filler of at least one of a coloring agent, a metal, or sulfate, oxide, carbonate, or silicate thereof, or ground rubber, wherein the filler is present in an amount from about 5 to 80 parts per hundred of the polymer. In another embodiment, the mantle further includes a filler having at least one of a coloring agent, a metal, or sulfate, oxide, carbonate, or silicate thereof, or ground rubber, present in an amount from about 1 to 20 parts per hundred of the polymer in the mantle.

In one embodiment, the first and second resilient polymer components each have a molecular weight average of about 50,000 to 1,000,000. In another embodiment, at least one organic peroxide is present in at least one of the center or mantle in an amount from about 0.05 to 5 parts per hundred of the polymer present in the center or mantle. In another embodiment, each crosslinking agent includes a metallic salt selected from the group of an unsaturated fatty acid, a monocarboxylic acid, and mixtures thereof. In yet another embodiment, the uncrosslinked mantle layer has a flexural modulus of greater than about 3.5 MPa.

In another embodiment, the reinforcing polymer component includes at least one of a block copolymer ether/ester, an acrylic polyol, a trans-polyisoprene, a trans-polybutadiene, a 1,2-polybutadiene, an ethylene-vinyl acetate copolymer, a polyethylene or copolymer thereof, an ionomer resin, or a trans-polyoctenamer. In yet another embodiment, the center and the mantle together form a golf ball core having a midpoint and the center of the center is disposed within about 40 mils on average from the midpoint of the core. In yet another embodiment, the core has a moment of inertia, the center and the mantle each have a hardness, and the value of the moment of inertia divided by a ratio of the center hardness divided by the mantle hardness is greater than about 65 g•cm$^2$.

The invention also relates to a golf ball having a core including a cis-polybutadiene polymer component to impart resilience, a reinforcing polymer component having a crystalline melting temperature from about 35° C. to 120° C., and a crosslinking agent present in an amount from about 36 to 50 parts per hundred of the polymer, wherein the reinforcing component comprises at least one of trans-polyisoprene, balata, or trans-polybutadiene present in an amount from about 1 to 40 parts per hundred and the cis-polybutadiene is present in an amount from about 60 to 99 parts per hundred of the polymer, wherein at least a portion of the uncrosslinked core is sufficiently rigid prior to crosslinking to inhibit the polybutadiene polymer component from substantially altering shape, and a cover having at least one layer disposed concentrically about the core having a Shore D hardness greater than about 40.

In one embodiment, the core further includes filler present in an amount sufficient to increase the density of the core. In another embodiment, the core further includes a center having a 1,4-cis-polybutadiene polymer component to impart resilience to the ball and a second crosslinking agent present in an amount from greater than 12 to about 35 parts per hundred of the polymer. In yet another embodiment, the center further includes a filler having at least one of a coloring agent, a metal, or sulfate, oxide, carbonate, or silicate thereof, or ground rubber, wherein the filler is present in an amount from about 1 to 80 parts per hundred of the polymer in the center.

In one embodiment, the polybutadiene polymer component has a molecular weight average of about 50,000 to 1,000,000. In another embodiment, the polybutadiene polymer component in the center is present in an amount from about 70 to 90 parts per hundred of the polymer. In yet another embodiment, the center further includes at least one organic peroxide present in an amount from about 0.05 to 5 parts per hundred of the polymer. In yet another embodiment, each crosslinking agent includes a metallic salt selected from the group consisting of an unsaturated fatty acid, a monocarboxylic acid, and mixtures thereof. In another embodiment, the uncrosslinked core has a flexural modulus of greater than about 3.5 MPa.

In one embodiment, the reinforcing polymer component includes at least one of a block copolymer ether/ester, an acrylic polyol, a trans-polyisoprene, a trans-polybutadiene, a 1,2-polybutadiene, an ethylene-vinyl acetate copolymer, a polyethylene or copolymer thereof, an ionomer resin, or a trans-polyoctenamer. In yet another embodiment, the center and mantle together form a golf ball core having a midpoint and the center of the center is disposed within about 40 mils on average from the midpoint off the core. In another embodiment, the core has a moment of inertia, the center and the mantle each have a hardness, and the value of the moment of inertia divided by a ratio of the center hardness divided by the mantle hardness is greater than about 65 g•cm$^2$.

The invention also relates to a golf ball including a center having a cis-polybutadiene polymer having a molecular weight average from about 200,000 to 500,000 to impart resilience, an acrylate crosslinking agent present in an amount from greater than 12 to about 25 parts per hundred of the polymer, and filler present in an amount from about 30 to 60 parts per hundred of the polymer; a mantle disposed concentrically about the center having from about 10 to 30 parts trans-polyisoprene polymer and 70 to 90 parts of cis-polybutadiene polymer, an acrylate crosslinking agent present in an amount from about 36 to 40 parts per hundred of the polymer in the mantle, and filler present in an amount from about 3 to 10 parts per hundred of the polymer in the mantle, wherein the mantle layer is sufficiently rigid prior to crosslinking to inhibit the cis-polybutadiene polymer in the mantle from substantially altering shape; and a cover having at least one layer disposed concentrically about the mantle.

The invention also relates to a multi-layer golf ball including a golf ball core having a moment of inertia which includes a center having a first hardness made of a first resilient polymer component, a first crosslinking agent, and a first filler present in an amount from about 5 to 80 parts per hundred of the polymer; and a mantle having a second hardness and having at least one layer disposed concentrically about the center, which layer is made of a second resilient polymer component, a second crosslinking agent present in an amount from about 36 to 50 parts per hundred of the polymer, and a second filler present in an amount from about 1 to 20 parts per hundred of the polymer, wherein the mantle layer is sufficiently rigid prior to crosslinking to inhibit the second resilient polymer component in the mantle from substantially altering shape, and a cover having at least one layer disposed concentrically about the mantle, wherein the moment of inertia of the core divided by the value of the first hardness divided by the second hardness is greater than about 65 g•cm$^2$.

The invention also relates to a multi-layer golf ball including a golf ball core having a moment of inertia which includes a center having a first hardness and a mantle having at least one mantle layer having a second hardness disposed concentrically about the center, and a cover having at least one cover layer disposed concentrically about the mantle, wherein the moment of inertia of the core divided by the value of the first hardness divided by the second hardness is greater than about 65 g•cm$^2$.

BRIEF DESCRIPTION OF THE DRAWINGS

Further features and advantages of the invention can be ascertained from the following detailed description that is provided in connection with the drawing described below.

DETAILED DESCRIPTION OF THE INVENTION

Figure 1:
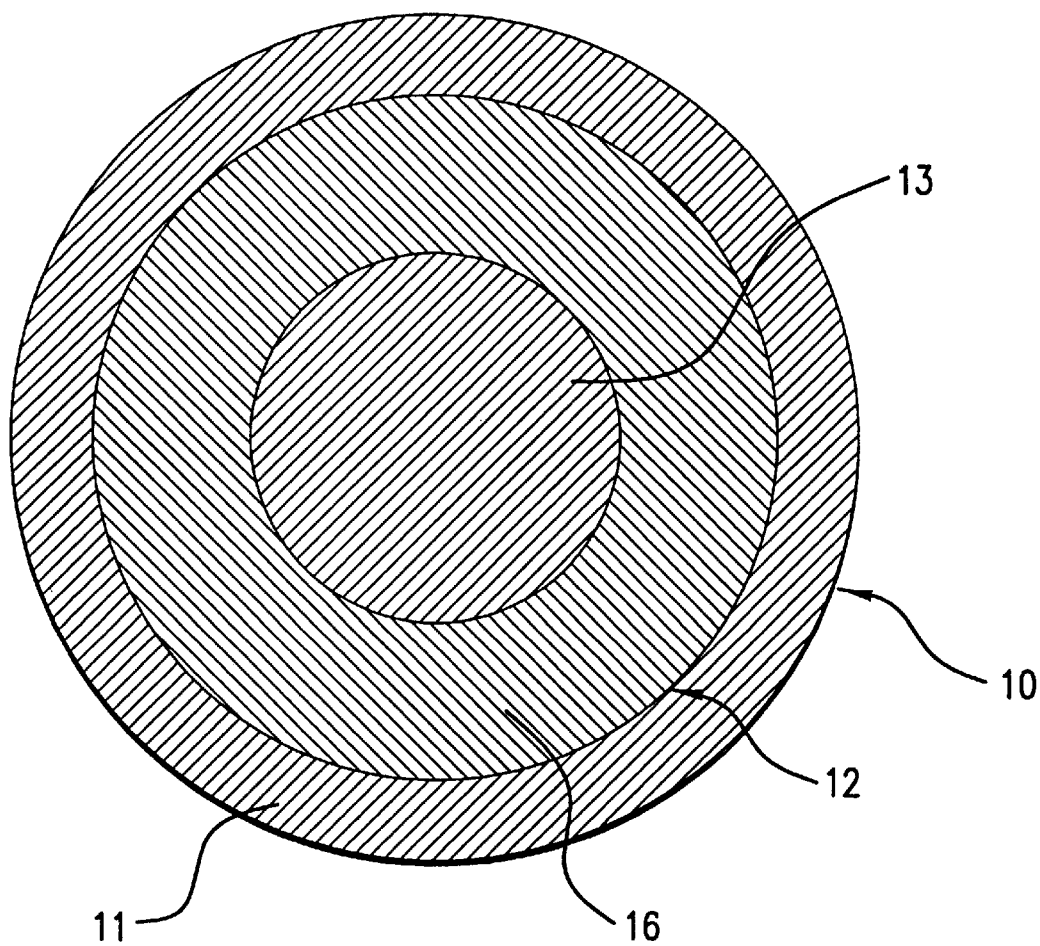
FIG. 1 illustrates the dual core golf ball according to the present invention.

An improved golf ball has now been discovered that has improved centering using one of several methods to overcome the "memory" problem common when using thermoset materials prior to the crosslinking thereof. The golf balls produced according to the invention thus have the feel, spin off a driver and irons, and straighter flight characteristics desired by most players of the game.

The present invention includes a novel composition and method of making golf balls and portions thereof, and the ball and ball portions thereby produced, to advantageously improve the centering of the mantle relative to the center of the ball. The composition of the invention is advantageously used in forming a plurality of shells that are assembled about a center and that form at least one layer of the mantle. The shells and resultant mantle include a reinforcing polymer component, a resilient polymer component, a free-radical initiator, a crosslinking agent and one or more optional fillers. The use of the reinforcing polymer component with the resilient polymer component in the shells, and consequently the mantle, impart reinforcement that inhibits or prevents the resilient polymer from relaxing to an earlier or original position, thus avoiding the formation of an off-center ball during subsequent processing. The reinforcing polymer component imparts geometrical stability to the uncrosslinked material used to form the mantle, at least in part by inhibiting shifting of the mantle before or during assembly about the center. Improved centering of the mantle about the center advantageously results in a more symmetrical ball core.

The center of the ball is typically and preferably spherical, may be solid or fluid-filled, and is generally about 0.7 inches to 1.5 inches, preferably about 0.9 inches to 1.3 inches, and more preferably about 1.05 to 1.2 inches in diameter. Resilient polymers suitable for use in the resilient polymer component of the center or mantle of the ball core include polybutadiene, polyisoprene, styrene-butadiene, styrene-propylene-diene rubber (EPDM), mixtures thereof, and the like. The resilient polymer component may include one or more polymers suitably resilient for golf ball formation and use, but the component preferably includes polyisoprene or polybutadiene ("PBD"), more preferably polybutadiene, and most preferably a 1,4-cis-polybutadiene. One example of a 1,4-cis-polybutadiene is CARIFLEX BR 1220, commercially available from H. MUEHLSTEIN & CO., INC. of Norwalk, Conn. The polybutadiene or other resilient polymer component may be produced with any suitable catalyst that results in a predominantly 1,4-cis content, and preferably with a catalyst that provides a high 1,4-cis content and a high molecular weight average. The resilient polymer component has a high molecular weight average, defined as being at least about 50,000 to 1,000,000, preferably from about 100,000 to 750,000, and more preferably from about 200,000 to 500,000. CARIFLEX BR 1220 has a molecular weight of about 220,000 when measured with reference to a polystyrene standard and an absolute molecular weight of about 400,000. The molecular weights are calculated on a weight average basis. The 1,4-cis component of polybutadiene is generally the predomninant portion of the resilient polymer component when polybutadiene is present. "Predominant" or "predominantly" is used herein to mean greater than 50 percent of the polybutadiene is 1,4-cis-polybutadiene. The 1,4-cis component is preferably greater than about 90 percent, and more preferably greater than about 95 percent, of the polybutadiene component.

Suitable crosslinking agents used in the ball core, i.e., the center or the mantle, include one or more metallic salts of unsaturated fatty acids or monocarboxylic acids, such as zinc, calcium, or magnesium acrylate salts, and the like. In addition to the crosslinking agents, one or more reactive co-agents may optionally be added that facilitate crosslinking. An exemplary co-curing agent is trimethylolpropane trimethacrylate, which is commercially available as SR-350 from Sartomer of Exton, Pa. With reference to the crosslinking agents, preferred acrylates include zinc acrylate, zinc diacrylate, and zinc methacrylate. Most preferably, zinc diacrylate ("ZDA") is selected as the crosslinking agent. When reference is made herein to first and second crosslinking agents, it should be understood that the first and second crosslinking agents are independently selected and may be the same or different. The crosslinking agent must be present in an amount sufficient to crosslink the various chains of polymers in the polymer blend to themselves and to each other. The crosslinking agent is generally present in the center in an amount from greater than 12 phr to about 35 phr, preferably from about 17 phr to about 27 phr, and more preferably from about 20 phr to 24 phr. The desired elastic modulus for the mantle may be obtained by adjusting the amount of crosslinking by selecting a particular type or amount of crosslinking agent. This may be achieved, for example, by altering the type and amount of crosslinking agent, which method is well known to those of ordinary skill in the art.

Fillers are typically also added to the composition used in the shells for the mantle, the center, or both ball portions, generally to increase the density of the core to conform to uniform golf ball standards. Fillers may also be used to modify the weight of the core for specialty balls used by players, e.g., a lower weight core is preferred for a player having a low swing speed. Fillers typically also include processing aids or compounds to affect rheological and mixing properties, the specific gravity, the modulus, the tear strength, reinforcement, color (such as a coloring agent), and the like. The fillers are generally inorganic, and suitable fillers include numerous metals, or oxides, sulfates, carbonates, or silicates thereof, as well as other carbonates and silicates, clay, tungsten, tungsten carbide, and the like, and mixtures thereof. For example, suitable metal oxides include zinc oxide and tin oxide; suitable sulfates include barium sulfate and zinc sulfate; and suitable carbonates include calcium carbonate and barium carbonate. The fillers, when used, are typically present in the center in an amount from about 5 to 80 phr, preferably from about 10 to 60 phr, and more preferably from about 40 to 50 phr, of the polymer in the center. Preferred fillers for use in the core include zinc oxide or barium sulfate, or both. These fillers advantageously provide a significantly clearer picture of the concentricity of the center when subjected to x-rays.

Although not required, a free-radical initiator is preferably included in one or more portions of the core. The free-radical initiator may be any compound or combination of compounds present in an amount sufficient to initiate a crosslinking reaction between a crosslinking agent and the reinforcing and resilient polymer components of the polymer blend. The free-radical initiator is preferably a peroxide. Suitable free-radical initiators include, for example, di(2-t-butyl-peroxyisopropyl)benzene peroxide, 1,1-bis(t-butylperoxy)-3,3,5-trimethylcyclohexane, dicumyl peroxide, di-t-butyl peroxide, 2,5-di-(t-butylperoxy)-2,5-dimethyl hexane, n-butyl-4,4-bis(t-butylperoxy)valerate on calcium silicate, lauroyl peroxide, benzoyl peroxide, t-butyl hydroperoxide, and the like, and mixtures thereof. The free-radical initiator is generally present in an amount of up to 5 phr, preferably from about 0.05 to 2 phr, and more preferably from about 0.1 to 1.5 phr, in the center. In a preferred embodiment, the free radical initiator is an inhibitor-containing peroxide. Suitable peroxides are well known to those of ordinary skill in the art and may be readily selected for use in the invention. Exemplary inhibitors, e.g., free radical scavengers, include 2,6-di-t-butylbenzoquinone, 2,6-di-t-butyl-4-methylene-2,5-cyclohexadiene-1-one, 2,6-di-t-butyl-4-hydroxybenzaldehyde, 2,6-di-t-butyl-4-isopropylphenol, 4,4'-methylene bis-(2,6-di-t-butylphenol), 1,2-bis-(3,5-di-t-butyl-4-hydroxyphenyl)ethane, 2,3,5,6-tetramethylbenzoquinone, 2-t-butylhydroquinone, 2,2'-methylenebis-(4-methyl-6-t-butylphenol), and the like, and mixtures thereof.

The above described resilient polymer component, crosslinking agent, and free-radical initiator and optional filler, are combined to provide a golf ball center having a specific gravity from about 1 to 1.5, preferably from about 1.15 to 1.35, more preferably from about 1.2 to 1.27. By providing this relatively high specific gravity center, the golf ball produced advantageously achieves a lower initial spin from a higher moment of inertia of the core. The shifting of additionally dense material from the mantle to the center also imparts greater initial velocity, which is a desirable feature for a golf ball. The moment of inertia of the core divided by a ratio of the center hardness to the mantle hardness is preferably increased to provide a spin that is not undesirably high. This calculated "spin ratio" should be greater than about 40 g•cm$^2$, preferably greater than about 65 g•cm$^2$, and more preferably greater than about 70 g•cm$^2$.

Preparing the center according to the discussion above results in a ball center having the following properties. The center hardness is preferably low and will generally be from about 30 to 50 Shore D, preferably from about 35 to 45 Shore D, and more preferably from about 38 to 42 Shore D. The center hardness may also be measured on a JIS-C scale, and will typically have a hardness gradient such that it is softer in the center of the center and harder on the surface of the center. This gradient is preferably linear, although other gradients may be suitably obtained by altering the amount and speed of crosslinking in the center. An exemplary ball center will have an ATTI compression of 17, a Shore D hardness of 40, and a JIS-C hardness of 54 in the middle of the center and 72 at the surface of the center.

Due to the relatively soft compression of golf ball centers, a load/deflection measurement may be used to more accurately reflect the center compression. A suitable method for measuring low compression components is to measure the load in pounds required to deflect the component 10.8 percent at a rate of 1 inch/minute. Thus, the center will generally have a load compression of about 50 to 156, preferably of about 95 to 130, and more preferably of about 110 to 120 when using the above described method.

It is envisioned that a tensioned elastomeric material may be wound around the center and before the mantle is added to form a wound golf ball, although it is preferred that the mantle be placed around the center without intervening layers. Optionally, the tensioned elastomeric material may be disposed about both the center and the mantle. It should be understood that the mantle is preferably formed as a pair of shells that are assembled over the center. Subsequent heat curing crosslinks the shells to form the mantle. The mantle should have a thickness of about 0.05 to 0.3 inches, preferably about 0.13 to 0.28 inches, more preferably about 0.17 to 0.24 inches. The entire core, including the center and mantle, should have a diameter of about 1.25 to 1.65 inches, preferably about 1.45 to 1.63 inches, where twice the mantle thickness is included in the core diameter since the mantle encloses the center. The mantle should be thick enough to form the core when molded over the center. The minimum mantle thickness is readily determined by one of ordinary skill in the art, and depends upon the specific materials used to form the mantle.

The volume ratio of the mantle to the center should be sufficiently high to achieve a sufficient velocity in the final golf ball. In one preferred embodiment, the center is 1.13 inches in diameter and the core is 1.58 inches in diameter. In this embodiment, the center is 30.3 volume percent, the mantle is 52.6 volume percent, and the cover is 17.1 volume percent. An increase in the relatively harder mantle volume relative to the relatively softer center, as well as an increase in the volume of both relative to the cover volume, advantageously results in a greater initial velocity.

The shells, and resultant mantle, for use in a ball core include a resilient polymer component, which is used as the majority of the polymer blend in the composition and method. The resilient polymer component of the shells, and resultant mantle, may be independently selected from the resilient polymer components discussed above for the center. The resilient polymer component is typically present in the shells and mantle in an amount from at least about 60 phr, preferably from about 65 to 99 phr. and more preferably from about 70 to 90 phr, of the total polymer. The term "polymer blend" is used herein to mean the blend of the resilient polymer component and the reinforcing polymer component. The resilient polymer component imparts resilience to the core or mantle even when in the cured, or crosslinked, state The mantle also includes a reinforcing polymer component, which contains at least one polymer having a glass transition temperature sufficiently low to permit combination and mixing of the reinforcing polymer component with the resilient polymer component without initiating crosslinking of the crosslinking agent that is also typically present in the mixture, as described below. The reinforcing polymer component should have a sufficiently low viscosity at the mixing temperature when mixed with the resilient polymer component to permit proper mixing of the two polymer components. The reinforcing polymer component also typically has a glass transition temperature (and if crystalline, a crystalline melting point) sufficiently low to permit mixing with the resilient polymer component while avoiding substantial crosslinking or thermal degradation of the resilient component at the mixing temperature. The crystalline melting temperature is typically between about 35° C. to 120° C. Examples of polymers suitable for use as the reinforcing polymer component include: trans-polyisoprene (synthetic balata rubber), natural balata rubber, block copolymer ether/ester, acrylic polyol, a polyethylene, a polyethylene copolymer, 1,2-polybutadiene (syndiotactic), ethylene-vinyl acetate copolymer, trans-polyoctenamer, trans-polybutadiene, ionomer resin, and mixtures thereof. Particularly suitable reinforcing polymers include: HYTREL 3078, a block copolymer ether/ester commercially available from DuPont of Wilmington, Del.; a trans-polybutadiene, such as FUREN 88 obtained from Asahi Chemicals of Yako, Kawasakiku, Kawasakishi, Japan; KURRARAY TP251, a trans-polyisoprene commercially available from KURRARAY CO. of New York, N.Y. as KURRARAY AMERICA CO.; LEVAPREN 700HV, an ethylene-vinyl acetate copolymer commercially available from Bayer-Rubber Division, Akron. Ohio; a SURLYN ionomer resin commercially available from E.I. DuPont deNemours of Wilmington, Del.; and VESTENAMER 8012 or 6213, trans-polyoctenamers commercially available from Huls America Inc. of Tallmadge, Ohio. Preferably, a trans-polyisoprene or trans-polybutadiene is included in the reinforcing polymer component, wherein the trans-content is greater than 50 weight percent, preferably greater than about 90 weight percent, and more preferably greater than about 95 weight percent of the polyisoprene or polybutadiene. Some suitable reinforcing polymers for use in the reinforcing polymer component are listed below with their crystalline melting points and/or $T_g$.

| Polymer Type | Tradename | Crystalline Melt Temperature (° C.) | $T_g$ (° C.) |
| --- | --- | --- | --- |
| trans-polyisoprene | KURRARAY TP251 | 60 | −59 |
| trans-polybutadiene | FUREN 88 | 84 | −88 |
| Polyethylene | Dow LPDE | 98 | −25 |
| trans-polyoctenamer | VESTENAMER 8012 | 54 | −65 |

The reinforcing polymer component must be present in an amount sufficient to impart rigidity to the shells during processing. Also, the reinforcing polymer component, i.e., the additive polymer component, must have a viscosity sufficiently low to permit mixing of the reinforcing polymer component and the resilient polymer component. For example, trans-polyisoprene has a viscosity of less than 1,000,000 cPs at a mixing temperature of around 82° C. The viscosity of materials suitable for use in the invention may be readily determined by one of ordinary skill in the art. The viscosity should generally be below about 1,000,000 cPs to readily permit mixing. The reinforcing polymer component is typically present in an amount of up to about 40 phr, preferably about 1 to 35 phr, and more preferably 10 to 30 phr, of the polymer in the shells, particularly when trans-polyisoprene is used in the reinforcing polymer component. The uncrosslinked mantle should have a flexural modulus, as measured under ASTM D-790, Method II, of greater than about 3.5 MPa, and preferably greater than about 7 MPa. The reinforcing polymer components imparts a degree of rigidity to the shells sufficient to substantially maintain the desired shape until the first mixture is crosslinked. The desired shape of the shells is typically substantially hemispherical or elliptical, such that a sphere or slight ellipsoid is formed by assembling two uncrosslinked shells about a center.

The mantle preferably includes a crosslinking agent that may be independently selected from the suitable crosslinking agents and amounts described above for the center. The crosslinking agent is typically added to the mantle in an amount from about 36 to about 50 phr of the polymer, preferably from at least about 36 to 45 phr, more preferably from at least 36 to 40, and most preferably from about 37 to 39 phr, of the polymer. The mantle preferably includes an free radical initiator and amounts thereof, independently selected from the suitable initiators discussed above for the center. Moreover, the mantle typically includes fillers independently selected from the suitable fillers discussed above for the center. The fillers are typically present in the mantle in an amount from about 1 to 20 phr, preferably from about 2 to 12 phr, and more preferably from about 4 to 8 phr.

The resilient polymer component, reinforcing polymer component, free-radical initiator, and any other materials used in forming the golf ball core in accordance with invention may be combined by any type of mixing known to one of ordinary skill in the art. A suitable system, for example, would include trans-polyisoprene, which melts at around 60° C., as the reinforcing component and a dicumyl peroxide, which substantially initiates reaction at around 170° C., as the free radical initiator. Suitable types of mixing include single pass and multi-pass mixing, and the like. The crosslinking agent, optionally along with additives, such as fillers, used to modify the characteristics of the golf ball center, may similarly be combined by any type of mixing. A single-pass mixing process where ingredients are added sequentially is preferred, as this type of mixing tends to increase efficiency and reduce costs for the process. Suitable mixing equipment is well known to those of ordinary skill in the art, and such equipment may include a Banbury mixer or a twin screw extruder. Conventional mixing speeds for combining polymers are typically used, although the speed must be high enough to impart substantially uniform dispersion of the resilient and reinforcing polymer components. On the other hand, the speed should not be too high, as high mixing speeds tend to break down the polymers being mixed and particularly may undesirably decrease the molecular weight of the resilient polymer component. The speed should thus be low enough to avoid high shear, which may result in loss of desirably high molecular weight portions of the resilient polymer component. Also, too high a mixing speed may undesirably result in creation of enough heat to initiate the crosslinking before the preforms are shaped and assembled around a core. The mixing temperature depends upon the type of resilient and reinforcing polymer components, and more importantly, on the type of free-radical initiator. The mixing temperature must be higher than the melting temperature of the reinforcing polymer component, but not so high as to initiate substantial crosslinking. For example, when using di(2-t-butyl-peroxyisopropyl)benzene peroxide as the free-radical initiator, a mixing temperature of about 80° C. to 125° C., preferably about 88° C. to 110° C., and more preferably about 90° C. to 100° C. is suitable to safely mix the ingredients. The mixing speed and temperature are readily determinable by one of ordinary skill in the art without undue experimentation.

The shells and resultant mantle have a specific gravity that is advantageously lower than the center. The fairly low specific gravity of the mantle is preferably from about 1 to 1.25, preferably from about 1.02 to 1.2, more preferably from about 1.04 to 1.12. By providing this relatively low specific gravity mantle, the golf ball produced advantageously has an improved initial velocity as noted above.

The core compression, i.e., the mantle over the center, has an ATTI compression from about 60 to 90, preferably from about 70 to 85, more preferably from about 75 to 80. The core also typically has a hardness from about 35 to 70 Shore D, preferably from about 45 to 60 Shore D, more preferably from about 49 to 55 Shore D. In a preferred embodiment, the shells include approximately 80 percent polybutadiene and 20 percent trans-polyisoprene as the reinforcing component, such that together they form 100 parts of the polymer component.

Any conventional material or method may be used in preparing the golf ball cover disposed over the core. For example, as is well known in the art, ionomers, balata, and urethanes are suitable golf ball cover materials. A variety of less conventional materials may also be used for the cover, e.g., thermoplastics such as ethylene- or propylene-based homopolymers and copolymers. These homopolymers and copolymers may also include functional monomers such as acrylic and methacrylic acid, fully or partially neutralized ionomers and their blends, methyl acrylate, methyl methacrylate homopolymers and copolymers, imidized amino group-containing polymers, polycarbonate, reinforced polycarbonate, reinforced polyamides, polyphenylene oxide, high impact polystyrene, polyether ketone, polysulfone, poly(phenylene sulfide), acrylonitrile-butadiene, acrylic-styrene-terephthalate, poly(ethylene terephthalate), poly(butylene terephthalate), poly(ethylene-vinyl alcohol), poly(tetrafluoroethylene), and the like. Any of these polymers or copolymers may be further reinforced by blending with a wide range of fillers, including glass fibers or spheres. Regardless of the materials included, the cover should have a Shore D hardness greater than about 40, preferably from about 50 to 70, more preferably from about 55 to 67. One way to achieve this hardness is to include a very low modulus ionomer ("VLMI") present from about 10 to 50 weight percent, preferably from about 20 to 40 weight percent, and more preferably from about 25 to 35 weight percent, in the cover. A variety of other suitable conventional cover blends are acceptable, so long as the provide the cover hardness described above. The selection of a suitable cover, and application thereof over the mantle described herein, will be readily determinable by those of ordinary skill in the art when considering the disclosure herein.

The cover is preferably a single layer having a thickness of about 0.02 to 0.08 inches, preferably about 0.03 to about 0.07 inches, and more preferably about 0.04 to about 0.06 inches. The diameter of the mantle corresponding to a particular center, and of the cover formed around the mantle and center, may be adjusted according to the diameter of the center to provide a golf ball formed according to the invention with the overall minimum diameter required by the USGA. One example of preferred ball dimensions according to the invention is a center having a diameter of 1.13 inches and a mantle having a thickness of 0.215 inches to provide a core having a 1.58 inch diameter, along with a cover having a thickness of 0.05 inches to provide an overall ball diameter of 1.68 inches. A cover prepared using the appropriate amount of VLMI according to the invention should have a hardness greater than about 40 Shore D, preferably from about 50 to 70 Shore D, more preferably from about 55 to 67 Shore D. The cover may be prepared by any suitable means known to those of ordinary skill in the art, for example, by compression molding.

The golf balls of the present invention, or portions thereof, are prepared as follows. A solid spherical center including one or more of the resilient polymer components described herein is prepared by at least one of conventional compression or injection molding, optionally followed by winding of a tensioned elastomeric material about the center. A fluid-filled center may alternatively be formed instead of a solid center. Any additionally desired center layers may then be added to the center by conventional compression or injection molding techniques, preferably in a concentric fashion to maintain a substantially spherical center.

The shells for the mantle may be prepared as ellipsoidal or hemispherical half-shells using conventional compression or injection molding techniques. The preferred method is to prepare two substantially hemispherical or ellipsoidal half-shells) preferably substantially hemispherical, that fit around the core and merge to form a layer of the mantle. When shells, also known as preps or preforms, are ellipsoidal, they preferably have a minor axis of 0.9 to 0.98 limes and a major axis of 1 to 1.5 times, preferably 1.02 to 1.1 times the mold cavity diameter when two half-shells are combined to form a mantle. The major and minor axes are measurements of the combination of two adjacent half-shells assembled about a center. The major and minor axes have different sizes due to the ellipsoidal shape of pairs of preforms, and when a pair of preforms is substantially spherical the major and minor axes are approximately the same size and are each equal to a diameter of the sphere formed by the two shells. When ellipsoidal, the shells have thicker crowns at their top and bottom and a thinner equator, i.e., ellipsoidal in shape, than a conventional spherical mantle that has a constant diameter at any orientation.

The preforms are prepared by mixing the resilient polymer component, the reinforcing polymer component, and any other ingredients together as discussed above. The resulting geometrical stability provides additional time for processing between preform formation and curing via compression molding, while the shells substantially maintain their hemispherical or semi-ellipsoidal shape. This additional time may be used to improve centering, manufacturability, optimize production scheduling, and the like, such as by preparation and stockpiling of rigid shells to facilitate molding machine shut down for maintenance or tool changes. With enough shells stockpiled, further golf ball manufacture could be carried out even while the preform injection machine is being retooled.

In one optional embodiment, the formed shells are cooled to below the stiffening temperature of the shells so as to increase the stiffness to provide additional rigidity prior to crosslinking thereof. The stiffening temperature is typically less than about 45° F. but no less than about −100° F., at which temperature the shells undesirably become highly brittle and may crack, splinter, or otherwise deform. The stiffened shells thus have increased geometric stability and are inhibited from relaxing to an earlier or original position, thus further avoiding the formation of an off-center ball during subsequent processing. After being stiffened, the shells are then assembled about a center and subjected to a heat curing to at least partially crosslink them. Once partially crosslinked, the memory problem becomes greatly diminished and the shells will substantially maintain their desired shape as described in co-pending application Ser. No. 09/146,553 filed Sep. 3, 1998, which is incorporated herein by reference thereto.

In another optional embodiment, the shells are at least partially cured by heating to increase the rigidity for assembly about the center, followed by a second heat curing to more fully cure the entire mantle layer. This is accomplished by using at least an initial and a final heat curing step, wherein some of the initiator remains in the partially cured mantle after the initial curing to initiate crosslinking during the final heat curing as described in co-pending application Ser. No. 09/145,882 filed Sep. 2, 1998, which is incorporated herein by reference thereto. Preferably, the shells include at least two initiators, one having a low initiation temperature that is substantially consumed in the initial heat curing at a first temperature, and one initiator having a higher initiation temperature that does not substantially react during the initial heat curing but that is substantially consumed during the final heat curing at a second, higher temperature. Any suitable free-radical initiators may be selected from the initiators discussed above for the center and mantle, but in this embodiment there are preferably two initiators in the shells having different initiation temperatures. As those of ordinary skill in the art understand, the initiation temperature is simply a convenient way to describe the half life of an initiator at a particular temperature, since some initiator is always being consumed at any given temperature. The initiation temperature should thus be understood as one where a given initiator will be substantially consumed in an amount of time acceptable for the production of golf balls, i.e., in less than 12 hours, more preferably in about 5 to 40 minutes.

Either the cooling embodiment or the initial partial cure embodiment, or both, may optionally be used with the golf ball of the invention. It should be understood that when one or both of these optional embodiments are used, the amount of reinforcing polymer component in the mantle may be reduced since the optional embodiment(s) will provide the additional rigidity needed to maintain the shells in a substantially constant shape prior to crosslinking.

The mixture of the polymer blend, free-radical initiator, a crosslinking agent, and any optional fillers may be extruded or pelletized for introduction into a molding machine for preparation of the mantle. The shells are preferably injection molded from the mixture based on cost and speed considerations, although compression molding is also suitable. The mold is preferably maintained at a temperature below the crystalline melting temperature of the reinforced polymer component to inhibit the formed shells from altering shape due to the memory of the resilient polymer component.

After their formation, the shells are assembled about the core, either by hand or machine. The rapid production of shells permits use of automated procedures for assembly about the center. When semi-ellipsoidal shells are used, they tend to vertically orient themselves when placed in hemispherical mold cups, which reduces preparation time, cost, and defects. The semi-ellipsoidal shells also inhibit formation of air cavities at the apex due to their having more material at the crown of the shell, thereby facilitating the expulsion of any trapped air out of the mold at the equator of the core where the two mold halves are typically combined for the molding of the mantle about the center. The assembly of the core, i.e., typically two shells and a center, are preferably compression molded. When the mold halves are combined, they form a rigid, spherical cavity. Once the mold is closed, any excess material from the shells is forced out of the mold cavity at the equator where the mold halves combine. The compression molding of the assembled shells and center tends to take about 5 to 40 minutes, although times may vary depending upon the materials and temperature used for the heat curing. For example, a typical curing cycle may take 12 minutes at around 174° C. The shells are forced together by the mold and substantially cured during molding. Optionally, if additional mantle layers are desired, e.g., having different characteristics to improve or modify the overall ball qualities, they may be provided over the first mantle layer. Additional mantle layers are preferably added after the previous mantle layer is cured, although they may be added before cure of the previous layer if the pre-cured mantle layer is rigid enough so that substantially no mixing of the layers occurs.

Balls prepared according to the invention with a reinforcing polymer component in the mantle tend to exhibit substantially the same resilience, or coefficient of restitution, as balls with conventional mantles. Another measure of this resilience is the "loss tangent," or tan δ, which is obtained by measuring the dynamic visco-elasticity of an object. Thus, a lower loss tangent indicates a higher resiliency, thereby indicating a higher rebound capacity. Loss tangent and a variety of other dynamic properties may be measured according to ASTM D4065-90, and terminology relating to such dynamic properties is typically described according to ASTM D4092-90. Low loss tangent indicates that most of the energy imparted to a golf ball from the club is converted to dynamic energy, i.e., launch velocity and resulting longer distance. The desired loss tangent in the crosslinked mantle material should be less than about 0.15 at −60° C. and less than about 0.05 at 30° C. when measured at a frequency of 1 Hz and a one percent strain. The rigidity, also called the compressive stiffness, of a golf ball may be measured, for example, by the dynamic modulus. A higher dynamic modulus indicates a higher compressive stiffness. To produce golf balls having a desirable compressive stiffness, and therefore a suitable "feel" to the player, the dynamic modulus of the crosslinked mantle material should be greater than about 100 MPa at −60° C. and greater than about 50 MPa at 30° C. measured at 1 Hz and one percent strain.

FIG. 1 illustrates one embodiment of a dual core ball 10 according to the invention. The mantle 16 is formed about the center 13 to form the dual core of the ball. The cover 11 is disposed over the dual core to form the golf ball having improved centering.

Figure 2:
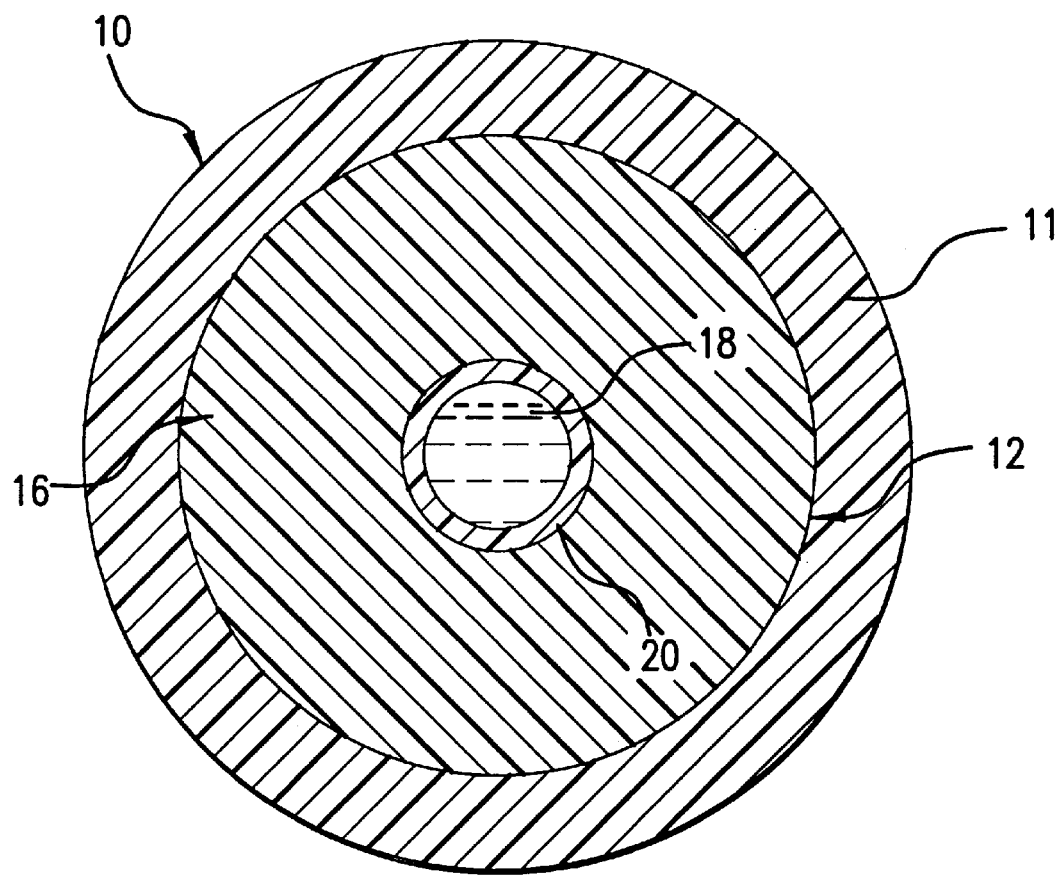
FIG. 2 illustrates a fluid-filled golf ball according to the present invention.

FIG. 2 illustrates another embodiment of a fluid-filled dual core golf ball 10 according to the invention. The core 12 includes a fluid 18, a fluid-containing component 20, such as a bladder, and a mantle 16. The mantle 16 is disposed about the fluid-containing component 20 that is at the center of the ball. The fluid-containing component 20 contains a liquid or gas fluid 18.

Figure 3:
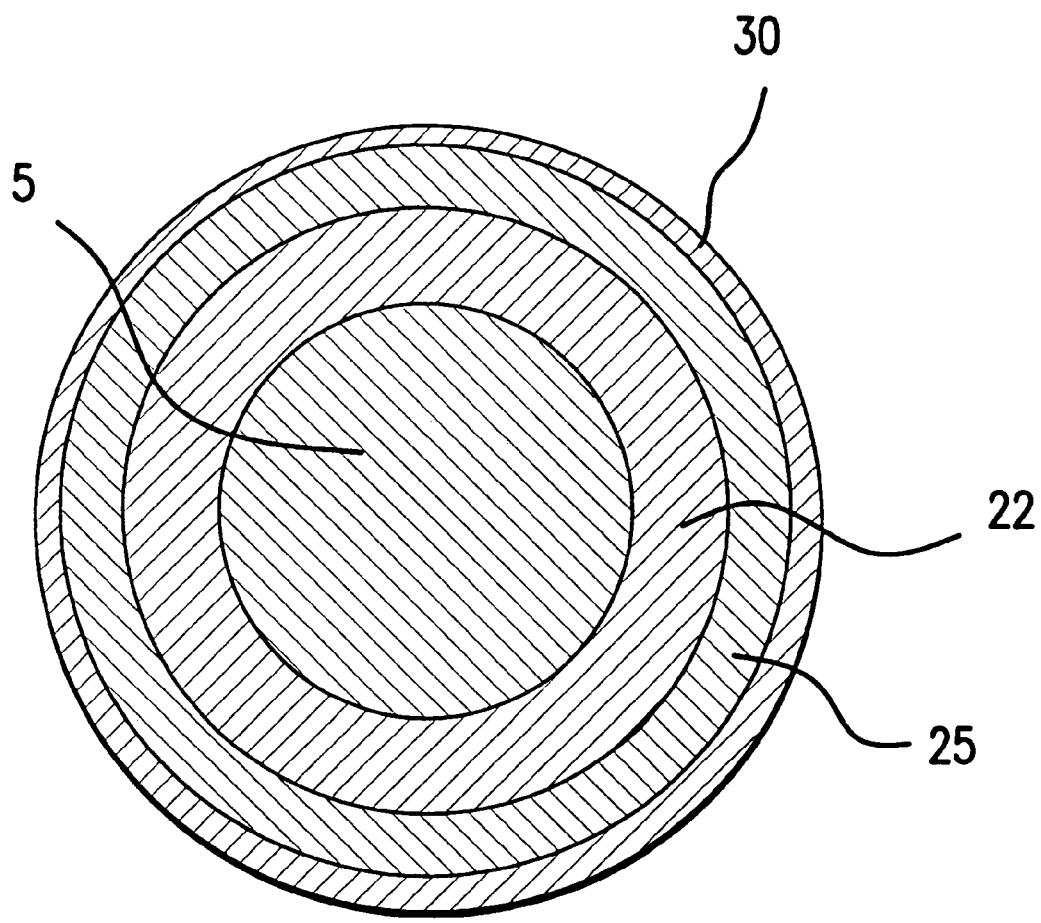
FIG. 3 illustrates a multi-layer golf ball having a tensioned elastomeric material disposed about the center.

FIG. 3 illustrates another embodiment of a tensioned elastomeric material disposed about the center of a multi-layer golf ball. The tensioned elastomeric material 22 may be disposed adjacent the center 5 and between the center 5 and an intermediate layer 25. However, the elastomeric material may instead be disposed about both the center and the intermediate layer such that the intermediate layer is between the center and tensioned elastomeric material (not shown). In either situation, the cover 30 is disposed about the entire core, which includes the center 5, tensioned elastomeric material 22, and intermediate layer 25.

In any of these or other suitable embodiments of the invention, the resulting ball, after a suitable cover is applied by conventional techniques, exhibits improved characteristics such as the low spin off a driver, higher spin off an iron, and a high coefficient of restitution desired by the vast majority of golf players. The semi-rigid ellipsoidal shells, as a result of combining the reinforcing polymer component and resilient polymer component, have a substantially improved concentricity of the mantle in relation to the core. For example, the center of a ball core prepared according to the invention is typically no more than about 40 mils (1 mm), preferably less than about 35 mils, and more preferably less than about 30 mils, on average from the center of the cured golf ball. Since every ball core and golf ball may have different centering, all centering data herein should be understood to mean the average of several randomly chosen balls. One of ordinary skill in the art of golf ball manufacture, as well as the typical player, will readily recognize that more accurate centering of the ball results in more consistent results and an improved game.

EXAMPLES

The following examples are provided only for the purpose of illustrating the invention and are not to be construed as limiting the invention in any manner.

Examples 1–5

Exemplary Mantle and Center Compositions

Sample mantle and center compounds were prepared and mixed according to the techniques described herein. The following mantle formulations 1–4 and center formulation 5 were prepared:

| Specific Gravity | Type of Compound | Ex. 1: Mantle PHR | Ex. 2: Mantle PHR | Ex. 3: Mantle PHR | Ex. 4: Mantle PHR | Ex. 5: Center PHR |
|---|---|---|---|---|---|---|
| 0.91 | Shell 1220 | 100 | 90 | 80 | 70 | 100 |
| 0.96 | TP 251 | 0 | 10 | 20 | 30 | 0 |
| 1.63 | ZDA | 38 | 38 | 38 | 38 | 22.6 |
| 0.99 | DCP-70 | 0.2 | 0.2 | 0.2 | 0.2 | 0 |
| 0.95 | Coloring | 0.3 | 0.3 | 0.3 | 0.3 | 0.3 |
| 1.03 | VAROX 802-40KE-HP | 0 | 0 | 0 | 0 | 0.9 |
| 1.41 | VAROX 231XL | 0.4 | 0.4 | 0.4 | 0.4 | 0 |
| 5.57 | Zinc Oxide | 7.2 | 6.5 | 5.7 | 4.9 | 5.2 |
| 4.30 | Barytes | 0 | 0 | 0 | 0 | 40.2 |
|  | Specific Gravity | 1.08 | 1.08 | 1.08 | 1.08 | 1.25 |

Color masterbatch is a filler that simply provides a colored composition.

The formulations described in Examples 1–5 above are but a few examples of compositions usable in the method of the present invention to form mantles and centers of golf balls exhibiting improved centering.

Examples 6–9

Flexural Modulus of Mantles Prepared According to the Invention

The flexural modulus of mantles 1–4 in their uncured and cured states with increasing amount s of reinforcing polymer component were prepared according to the invention and were determined according to ASTM D-790, Method II, and set forth below:

| Test | Example 6 0 phr TP251 | Example 7 10 phr TP251 | Example 8 20 phr TP251 | Example 9 30 phr TP251 |
|---|---|---|---|---|
| Flex modulus ASTM D790 UNCURED STOCK | 0.37 KSI (2.6 MPa) | 1.69 KSI (11.6 MPa) | 3.63 KSI (25.0 MPa) | 4.21 KSI (29.0 MPa) |
| Flex modulus ASTM D790 CURED STOCK | 23.82 KSI (164.2 MPa) | 21.67 KSI (149.4 MPa) | 21.67 KSI (149.4 MPa) | 15.71 KSI (108.3 MPa) |

These measurements are conducted on a flex bar specimen having the dimensions 3/16"×1/2"×4", which are produced by compression molding uncrosslinked mantle material. The flexural modulus of uncrosslinked mantles prepared according to the invention was measured using ASTM Method D-790, Method II, with a loading rate of 0.5 in/min. Examples 6–9 directly correspond to the mantle formulations of Examples 1–4. As can be clearly seen, increasing the amount of reinforcing component in the uncured mantle stock significantly increases the flexural modulus (i.e., rigidity) prior to curing, thereby vastly improving processing and centering of the final golf ball.

Examples 10–13

Properties of Dual Cores Prepared According to the Invention

The properties of several dual cores prepared according to the invention are set forth below in Examples 10–13, which were prepared by placing the respective mantles of Examples 6–9 over the center of Example 5.

| Test | Example 10 0 phr TP251 | Example 11 10 phr TP 251 | Example 12 20 phr TP251 | Example 13 30 phr TP251 |
|---|---|---|---|---|
| Core diameter (in.) | 1.578" | 1.578" | 1.579" | 1.579" |
| Weight (oz.) | 1.375 | 1.379 | 1.378 | 1.373 |
| ATTI Compression | 78 | 78 | 79 | 69 |
| Coefficient of Restitution @ 125 ft/s | 0.790 | 0.796 | 0.787 | 0.782 |
| Average Shift (in.) | 0.070" | 0.048" | 0.032" | 0.033" |

These examples illustrate that increasing amounts of reinforcing polymer component advantageously reduces the average shift of the center relative to the entire mantle and golf ball.

Examples 14–17

Golf Balls Prepared According to the Invention

Dual core golf balls prepared by placing a conventional cover over the dual cores of Examples 10–13. These dual core golf balls prepared according to the invention were examined and their properties set forth below:

| Test | Example 14 0 phr TP251 | Example 15 10 phr TP251 | Example 16 20 phr TP251 | Example 17 30 phr TP251 |
|---|---|---|---|---|
| Avg. Ball (in.) | 1.686" | 1.686" | 1.686" | 1.686" |
| Weight (oz.) | 1.61 | 1.61 | 1.61 | 1.60 |
| ATTI Compression | 90 | 92 | 91 | 85 |
| Initial Ball Velocity (ft/s) | 252.1 | 251.8 | 251.0 | 249.7 |
| Coefficient of Restitution @ 125 ft/s | 0.808 | 0.803 | 0.796 | 0.785 |
| Driver Spin | 2670 | 2710 | 2690 | 2700 |

These examples illustrate that increasing the amount of reinforcing polymer component provides a golf ball meeting the USGA standards and having improved centering according to the present invention.

Examples 18–23

"Spin Ratio" of the Invention Compared to Conventional Balls

The spin ratio of the ball of the invention and several conventional balls were calculated by taking a measured moment of inertia of the core, divided by a measured Shore D hardness of the center divided by a measured Shore D hardness of the mantle of each ball tested.

|    | Moment of Inertia for Core (g · cm²) | Center Hardness (Shore D) | Mantle Hardness (Shore D) | Spin Ratio Value (g · cm²) | Spin rate (rpm) |
|----|---|---|---|---|---|
| 18 | 60.6 | 40 | 52 | 78.8 | 2,700 |
| 19 | 52.1 | 44 | 44 | 52.1 | 2,900 |
| 20 | 49.5 | 40 | 45 | 55.7 | 2,800 |
| 21 | 50.4 | 45 | 57 | 63.8 | 2,900 |
| 22 | 53.9 | 47 | 52 | 59.6 | 2,850 |
| 23 | 52.0 | 51 | 59 | 60.2 | 3,000 |

Example 18 is a ball prepared according to the invention, while Examples 19–23 are competitors' conventional multi-layer balls having an undesirably low spin ratio value. Example 18 prepared according to the invention also has a lower spin rate than the conventional multi-layer balls of Examples 19–23.

It is to be recognized and understood that the invention is not to be. limited to the exact configuration as illustrated and described herein. For example, it should be apparent that a variety of suitable materials would be suitable for use in the composition or method of making the golf balls according to the Detailed Description of the Invention. Accordingly, all expedient modifications readily attainable by one of ordinary skill in the art from the disclosure set forth herein are deemed to be within the spirit and scope of the present claims.

What is claimed is:

1. A multi-layer golf ball comprising:
   a center comprising a first resilient polymer component and a first metal acrylate crosslinking agent present in an amount from greater than 12 to about 35 parts per hundred of the polymer;
   a mantle having at least one layer disposed concentrically about the center, which layer comprises a second resilient polymer component, a reinforcing polymer component having a crystalline melting temperature from about 35° C. to 120° C. present in an amount from about 1 to 40 parts per hundred of the total polymer, wherein the second resilient polymer component is present in an amount from about 60 to 99 parts per hundred of the total polymer and wherein the mantle layer is sufficiently rigid prior to crosslinking to inhibit the second resilient polymer component in the mantle from substantially altering shape; and
   a cover having at least one layer disposed concentrically about the mantle.

2. The ball of claim 1 wherein the at least one mantle layer further comprises a second metal acrylate crosslinking agent present in an amount from about 36 to 50 parts per hundred of the total polymer.

3. The ball of claim 1 wherein the center further comprises a filler including at least one of a coloring agent, a metal, or sulfate, oxide, carbonate, or silicate thereof, or ground rubber, wherein the filler is present in an amount from about 0.5 to 80 parts per hundred of the polymer.

4. The ball of claim 1 wherein the mantle further comprises a filler including at least one of a coloring agent, a metal, or sulfate, oxide, carbonate, or silicate thereof, or ground rubber, present in an amount from about 1 to 20 parts per hundred of the polymer in the mantle.

5. The ball of claim 1, wherein the first and second resilient polymer components each have a molecular weight average of about 50,000 to 1,000,000.

6. The ball of claim 1, wherein the second resilient polymer component is present in an amount from about 70 to 90 parts per hundred of the polymer in the mantle.

7. The ball of claim 1, further comprising at least one organic peroxide present in at least one of the center or mantle in an amount from about 0.05 to 5 parts per hundred of the polymer present in the center or mantle.

8. The ball of claim 2, wherein each crosslinking agent comprises a metallic salt selected from the group consisting of an unsaturated fatty acid, a monocarboxylic acid, and mixtures thereof.

9. The ball of claim 1, wherein the uncrosslinked mantle layer has a flexural modulus of greater than about 3.5 MPa.

10. The ball of claim 1, wherein the reinforcing polymer component comprises at least one of an acrylic polyol, a trans-polyisoprene, a trans-polybutadiene, a 1,2-polybutadiene, an ethylene-vinyl acetate copolymer, a polyethylene or copolymer thereof, ionomer resin, or a trans-polyoctenamer.

11. The ball of claim 1, wherein the center has a first geometric center and the center and mantle together form a golf ball core having a second geometric center and wherein the first geometric center is disposed within about 40 mils on average from the second geometric center.

12. The ball of claim 1, wherein the center and the mantle together form a golf ball core, wherein the core has a moment of inertia, the center and the mantle each have a Shore D hardness, and the value of the moment of inertia divided by a ratio of the center hardness divided by the mantle hardness is greater than about 65 g•cm².

13. The golf ball of claim 1, wherein the crosslinked mantle has a loss tangent of less than about 0.15 at −60° C. and less than about 0.05 at 30° C. and a dynamic modulus greater than about 100 MPa at −60° C. and greater than about 50 MPa at 30° C., each when measured at 1 Hz and one percent strain.

14. A multi-layer golf ball comprising:
   a center comprising a first resilient polymer component, a first crosslinking agent, and a first filler present in an amount from about 5 to 80 parts per hundred of the polymer;
   a mantle having at least one layer disposed concentrically about the center, which layer comprises a second resilient polymer component, a reinforcing polymer component, a second crosslinking agent present in an amount from about 36 to 50 parts per hundred of the polymer, and a second filler present in an amount from about 1 to 20 parts per hundred of the polymer, wherein the mantle layer is sufficiently rigid prior to crosslinking to inhibit the second resilient polymer component in the mantle from substantially altering shape and wherein the mantle layer has a lower density than the center and further wherein the uncrosslinked mantle layer has a flexural modulus of greater than about 3.5 MPa; and
   a cover having at least one layer disposed concentrically about the mantle.

15. The ball of claim 14 wherein the first crosslinking agent is present in an amount from greater than 12 to about 35 parts per hundred of the polymer.

16. The ball of claim 14, wherein the reinforcing polymer component has a crystalline melting temperature from about 35 C. to 120 C. and is present in an amount from about 1 to 40 parts per hundred and further wherein the second resilient polymer component is present in an amount from about 60 to 99 parts per hundred of the total polymer.

17. The ball of claim 14 wherein the center further comprises a filler including at least one of a coloring agent, a metal, or sulfate, oxide, carbonate, or silicate thereof, or ground rubber, wherein the filler is present in an amount from about 5 to 80 parts per hundred of the polymer.

18. The ball of claim 14 wherein the mantle further comprises a filler including at least one of a coloring agent, a metal, or sulfate, oxide, carbonate, or silicate thereof, or ground rubber, present in an amount from about 1 to 20 parts per hundred of the polymer in the mantle.

19. The ball of claim 14, wherein the first and second resilient polymer components each have a molecular weight average of about 50,000 to 1,000,000.

20. The ball of claim 14, further comprising at least one organic peroxide present in at least one of the center or mantle in an amount from about 0.05 to 5 parts per hundred of the polymer in the center or mantle.

21. The ball of claim 14, wherein each crosslinking agent comprises a metallic salt selected from the group consisting of an unsaturated fatty acid, a monocarboxylic acid, and mixtures thereof.

22. The ball of claim 14, wherein the reinforcing polymer component comprises at least one of a block copolymer ether/ester, an acrylic polyol, a trans-polyisoprene, a trans-polybutadiene, a 1,2-polybutadiene, an ethylene-vinyl acetate copolymer, a polyethylene or copolymer thereof, ionomer resin, or a trans-polyoctenamer.

23. The ball of claim 14, wherein the center has a first geometric center and the center and mantle together form a golf ball core having a second geometric center and the first geometric center is disposed within about 40 mils on average from the second geometric center.

24. The ball of claim 14, wherein the center and the mantle together form a golf ball core having a moment of inertia, the center and the mantle each have a Shore D hardness, and the value of the moment of inertia divided by a ratio of the center hardness divided by the mantle hardness is greater than about 65 g•cm2.

25. A golf ball comprising:
a core comprising a cis-polybutadiene polymer component to impart resilience, a reinforcing polymer component having a crystalline melting temperature from about 35° C. to 120° C., and a crosslinking agent present in an amount from about 36 to 50 parts per hundred of the total polymer, wherein the reinforcing component comprises at least one of trans-polyisoprene, balata, or trans-polybutadiene present in an amount from about 1 to 40 parts per hundred and the cis-polybutadiene is present in an amount from about 60 to 99 parts per hundred of the total polymer, wherein at least a portion of the uncrosslinked core is sufficiently rigid prior to crosslinking to inhibit the polybutadiene polymer component from substantially altering shape; and
a cover having at least one layer disposed concentrically about the core, wherein the cover has a Shore D hardness greater than about 40.

26. The ball of claim 25 wherein the core further comprises filler present in an amount sufficient to increase the density of the core.

27. The ball of claim 25 wherein the core further includes a center comprising a 1,4-cis-polybutadiene polymer component to impart resilience to the ball and a second crosslinking agent present in an amount from greater than 12 to about 35 parts per hundred of the polymer.

28. The ball of claim 25 wherein the center further comprises a filler including at least one of a coloring agent, a metal, or sulfate, oxide, carbonate, or silicate thereof, or ground rubber, wherein the filler is present in an amount from about 1 to 80 parts per hundred of the polymer in the center.

29. The ball of claim 27, wherein the polybutadiene polymer component comprises a molecular weight average of about 50,000 to 1,000,000.

30. The ball of claim 27, wherein the polybutadiene polymer component in the center is present in an amount from about 70 to 90 parts per hundred of the polymer.

31. The ball of claim 27, wherein the center further comprises at least one organic peroxide present in an amount from about 0.05 to 5 parts per hundred of the polymer.

32. The ball of claim 27, wherein each crosslinking agent comprises a metallic salt selected from the group consisting of an unsaturated fatty acid, a monocarboxylic acid, and mixtures thereof.

33. The ball of claim 25, wherein the uncrosslinked core has a flexural modulus of greater than about 3.5 MPa.

34. The ball of claim 25, wherein the reinforcing polymer component further comprises at least one of an acrylic polyol, a 1,2-polybutadiene, an ethylene-vinyl acetate copolymer, a polyethylene or copolymer thereof, ionomer resin, or greater than about 10 phr to 40 phr by weight of a trans-polyoctenamer.

35. The ball of claim 25, wherein the golf ball has a center having a first geometric center and the core has a second geometric center and the first geometric center is disposed within about 40 mils on average from the second geometric center.

36. The ball of claim 25, wherein the core has a moment of inertia, the center and the mantle each have a Shore D hardness, and the value of the moment of inertia divided by the value of the center hardness divided by the mantle hardness is greater than about 65 g•cm2.

37. A golf ball comprising:
a center comprising cis-polybutadiene polymer having a molecular weight average from about 200,000 to 500,000 to impart resilience, an acrylate crosslinking agent present in an amount from greater than 17 to about 27 parts per hundred of the polymer, and filler present in an amount from about 30 to 60 parts per hundred of the polymer;
a mantle disposed concentrically about the center comprising from about 10 to 30 parts trans-polyisoprene polymer and 70 to 90 parts of cis-polybutadiene polymer, an acrylate crosslinking agent present in an amount from about 36 to 45 parts per hundred of the total polymer in the mantle, and filler present in an amount from about 3 to 10 parts per hundred of the total polymer in the mantle, wherein the mantle layer is sufficiently rigid prior to crosslinking to inhibit the cis-polybutadiene polymer in the mantle from substantially altering shape; and
a cover having at least one layer disposed concentrically about the mantle.

38. A multi-layer golf ball comprising:
a golf ball core having a moment of inertia which comprises a center having a first Shore D hardness comprising a first resilient polymer component, a first crosslinking agent, and a first filler present in an amount from about 5 to 80 parts per hundred of the polymer; and a mantle having a second Shore D hardness and having at least one layer disposed concentrically about the center, which layer comprises a second resilient polymer component, a reinforcing polymer component, a second crosslinking agent present in an amount from about 36 to 50 parts per hundred of the polymer, and a second filler present in an amount from about 1 to 20 parts per hundred of the polymer, wherein the mantle layer is sufficiently rigid prior to crosslinking to inhibit the second resilient polymer component in the mantle from substantially altering shape and wherein the mantle layer has a lower density than the center; and a cover having at least one layer disposed concentrically about the mantle, wherein the moment of inertia of the core divided by the value of the first Shore D hardness divided by the second Shore D hardness is greater than about 65 g•cm².

39. A multi-layer golf ball comprising:

a golf ball core having a moment of inertia which comprises a center having a first Shore D hardness and a mantle having at least one mantle layer having a second Shore D hardness disposed concentrically about the center, the mantle comprising a resilient polymer component and a reinforcing polymer component having a crystalline melting temperature from about 35 C. to 120° C., the mantle being sufficiently rigid prior to crosslinking to inhibit the second resilient polymer component from substantially altering shape and wherein the mantle layer has a lower density than the center; and a cover having at least one cover layer disposed concentrically about the mantle, wherein the moment of inertia of the core divided by a ratio of the value of the first Shore D hardness divided by the second Shore D hardness is greater than about 65 g•cm².

* * * * *